April 5, 1966 G. H. ADAMSON ETAL 3,243,996
HYGROMETRIC METHOD AND TESTING APPARATUS
Filed Dec. 20, 1963 2 Sheets-Sheet 1
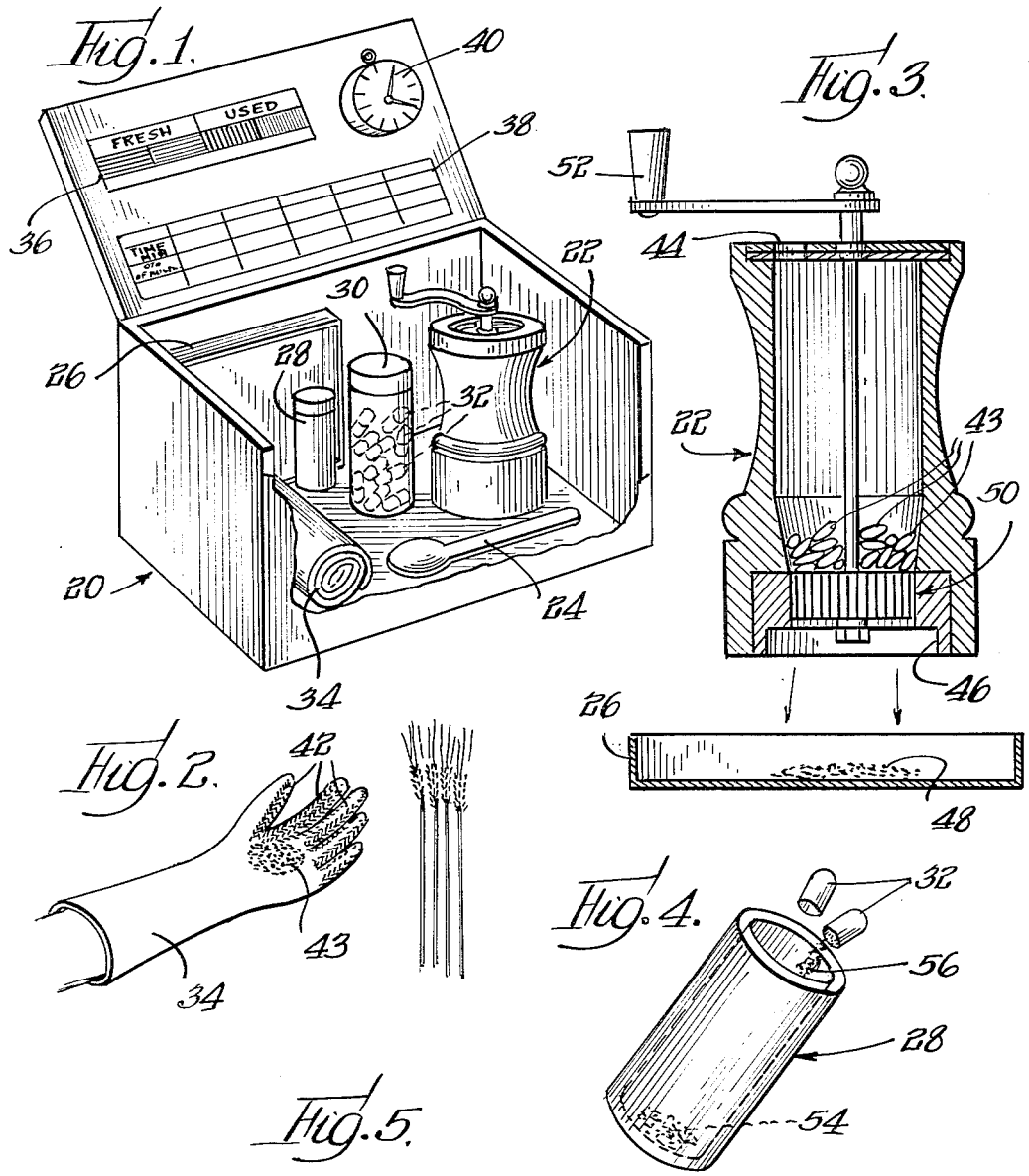
INVENTORS
George H. Adamson
Kenneth J. Kohanzo
By: Olson, Trexler, Wolters & Bushnell
attys.

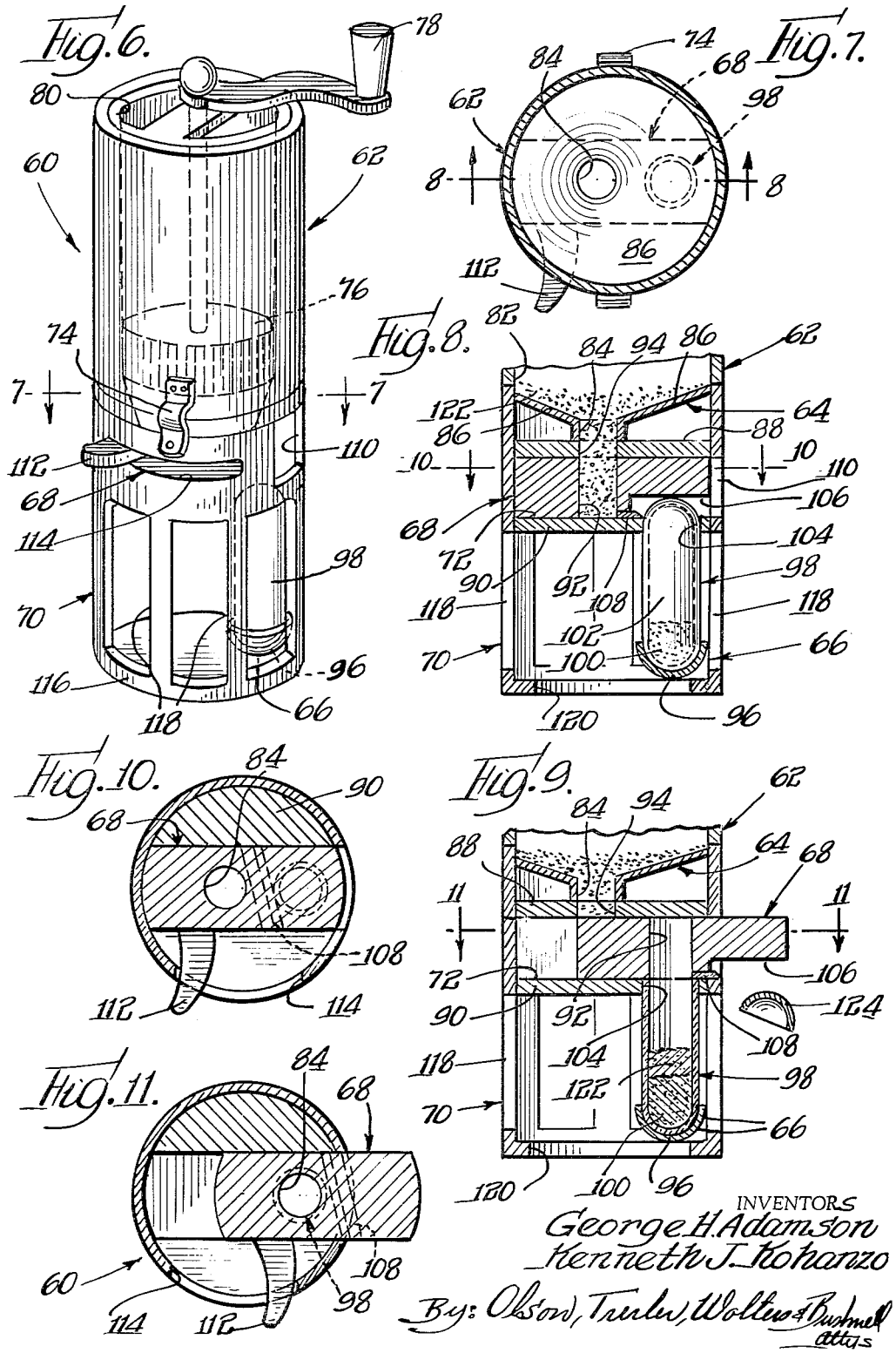

United States Patent Office 3,243,996
Patented Apr. 5, 1966

3,243,996
HYGROMETRIC METHOD AND TESTING
APPARATUS
George H. Adamson, % Gadsden Hotel, Douglas, Ariz., and Kenneth J. Kohanzo, 29 E. Madison St., Chicago, Ill.
Filed Dec. 20, 1963, Ser. No. 332,125
12 Claims. (Cl. 73—73)

This invention relates generally to the art of testing various products and materials for the presence of an extractible constituent and relates more particularly to apparatus for and methods of quantitatively determining the presence of such a constituent.

In one specific aspect, the present invention relates to hygrometric methods and testing apparatus.

Extractible moisture is commonly present in many agricultural and industrial products as a naturally occurring constituent; however, the amount of this incorporated moisture can exceed certain practical limits thereby rendering the product unfit for a particular intended purpose. For example, sharp sand is ordinarily used as fine aggregate in concrete, and sharp sand contains variable amounts of absorbed moisture. The water content of a batch of concrete, being critical to the quality of the finished product, can therefore be thrown out of acceptable limits by the amount of moisture carried into the batch by the sand. Large commercial concrete mixing operations, like large grain elevators and other enterprises dealing with moisture-bearing products, accordingly utilize appropriate testing devices in order to insure a quality output. Nonetheless, the hydrometric methods and testing apparatus of the prior art have been characterized by realtively high cost. Expensive and comparatively delicate electrical circuitry has been almost universally employed, and repeated expenditures for replacement batteries have been necessary for portable units. As a result of the cost picture and the nature of prior art developments, small operators have been denied the opportunity of conducting their own tests, and field testing has been substantially precluded.

Hence, an important object of the present invention is to provide low cost apparatus for determining the moisture content of various products.

A further object of the invention is to provide a hydrometric method that is inexpensive to practice.

A more general object of the invention is to provide new and improved methods and apparatus for quantitatively determining the presence of an extractible substance in a solid material.

Another object of the invention is to provide such methods and apparatus that are adaptable to a wide range of products.

Still another object of the invention is to provide testing apparatus that is sufficiently resistant to shock and abuse to permit its use in the field.

And still another object of the invention is to provide testing apparatus that is simple and easy to use.

Yet another object of the invention is to provide a testing method that is sufficiently accurate for field use.

And yet another object of the invention is to provide a testing method which employs testing materials that are nontoxic and of long shelf life.

These and other objects and features of the invention will become more apparent from a consideration of the following disclosure.

In compliance with the procedural aspects of the invention, an extractible substance such as moisture, which is found in a solid material such as ripening grain or sand, its quantitatively determined by first providing the solid material in particulate form. In the case of clean sand, the product is of its nature finely divided. However, for more coarse materials such as the seeds of grain comminuting has been found necessary to expose the extractible substance to ready removal. Suitable milling or grinding devices are conveniently employed in this latter regard as will be described more fully hereinafter with respect to the apparatus aspects of the invention.

A predetermined amount of the particulate material to be tested is measured out; and in this regard, gravimetric mensuration may be employed although volumetric determination has proved to be more convenient in field testing. The predetermined amount of the particulate solid material to be tested is mixed with a selected quantity of an indicator substance. This indicator substance is selected to possess an affinity for the extractible substance, to undergo a color change upon taking up certain amounts of that substance, and to possess the ability to take up various amounts of the extractible substance in determinable periods of time. The indicator substance is advantageously employed in particulate form. When moisture comprises the extractible substance, the indicator is desirably provided initially in the anhydrous state to facilitate its taking up moisture. Furthermore, the indicator substance may be mixed with a deliquescent material such as silica gel in order to enhance extraction of the moisture and in order to render it particulate when of either liquid or gaseous nature. Admixture with such a dessicant also prevents mixture from contaminating the indicator whereby to prolong its shelf life. Anhydrous crystals of cobalt chloride have proved eminently useful as an indicator substance when moisture is the material for determination. Other indicator substances are selected in accordance with the nature of the extractible material to be determined. For example, when the extractible substance is an oil having an acid reaction, the indicator substance may be phenolphthalein dissolved in ethyl alcohol and combined with a lipophilic material such as decolorized beef tallow or lard. The resultant product may be rendered free flowing by subjecting it to conventional spray cooling techniques.

From the instant that the measured amount of the solid material is brought into contact with the indicator substance and during the period that the two are mixed, time is recorded and kept until the indicator substance reaches a particular color that corresponds with its having taken up a certain amount of the extractible substance. The time which is thus required for the indicator substance to reach a predetermined color is then translated into a quantitative measure of the relative or proportionate presence of the extractible substance in the solid material being tested. Advantageously, a chart is provided for converting the time determinations directly into percentage content of the extractible substance. The relationship involved must be determined empirally from the predetermined amount of the solid material and the selected quantity of the indicator substance together with the nature of the indicator substance itself. A specific example of this relationship between time and percentage content of the extractible substance will be set forth more fully hereinafter with regard to the apparatus aspects of the invention.

Usefully, the mixing of the particulate solid material and the indicator substance is caused to take place in a substantially closed environment, and the mixture is held in continuation of this substantially closed environment during the period that the indicator substance is undergoing its color change. This procedure minimizes the adverse effects of atmospheric contamination and promotes accuracy in the quantitative determinations. In addition, only relatively small amounts of the material to be tested and of the indicator are required for each determination. Quantities on the order of ¼ to ½ teaspoonful of the tested material and lesser amounts of the indicator are ordinarily involved. Hence, the cost of making an individual test or determination is extremely low.

The testing method of the invention is susceptible to a wide variety of usages in free flowing products of relatively uniform chemical and granular make-up as well as products which may be reduced to particulate form. When moisture content alone is considered, the invention finds special value for building materials such as sand and wood; industrial products such as dried blood, plastic molding powders and wood pulp; and agricultural products such as nuts, hops, flower and vegetable garden seeds, flax, corn, wheat, oats, rice, sorghums, beans, popcorn and barley. Moisture testing of agricultural products is of particular importance in determining their storability and their market value. The invention also finds utility in controlling field drying operations involving hay, citrus pulp and like products. As will be recognized, the relationship between moisture content and the time required for the indicator substance to undergo a particular color change must be regulated not only for the volumetric amounts of sample involved and the indicator substance itself but also for the variations due to the different densities of these materials, moisture content being desirably available as a weight percentage.

In order that the principles of the invention may be more fully understood, two embodiments of testing apparatus constructed in accordance with the invention, but to which the application is not to be restricted, are shown in the accompanying drawings wherein:

FIG. 1 is a perspective view of testing equipment and supplies collected in a carrying case in accord with the invention for transport to a field site;

FIG. 2 is a perspective view showing the collection of a sample of grain in such a manner as to avoid contamination by moisture from the hands of the person making the collection;

FIG. 3 is an enlarged, elevational view, taken in cross-section and showing the milling device of FIG. 1 being used to grind the collected sample of grain into the collecting tray;

FIG. 4 is an enlarged perspective view of the mixing container of FIG. 1, showing the indicator substance being introduced into the previously ground and measured sample of grain;

FIG. 5 is a detailed showing of the chart of FIG. 1, which chart is used in converting the test period times into percentage moisture in the grain being examined;

FIG. 6 is a perspective view of a modified testing apparatus constructed in compliance with the principles of the invention and arranged for mixing of the test sample and the indicator substance in a substantially closed environment;

FIG. 7 is a slightly enlarged view taken substantially along the lines 7—7 of FIG. 6;

FIG. 8 is an elevational view taken substantially along the line 8—8 of FIG. 7 and showing the transfer unit and incising element in ready position;

FIG. 9 is a view similar to the showing of FIG. 8 but illustrating the transfer unit and incising element in position after cutting the top off a shearable cartridge, further showing alignment of the measuring bin of the transfer unit with the now open cartridge for depositing a measured sample of the material to be tested into the cartridge with the indicator substance preliminary filled therein;

FIG. 10 is a plan view in cross-section taken substantially along the line 10—10 of FIG. 8; and FIG. 11 is a plan view in cross-section taken substantially along the line 11—11 of FIG. 9.

Referring now in detail to the drawings, specifically to FIG. 1, a variety of testing equipment and supplies will be seen collected in a carrying case 20. The case 20 is fabricated from a tough, resinous plastic material in order to be resistant to shock and rough usage, and the case 20 is desirably fashioned to be weathertight in accordance with conventional schemes. In addition, the case 20 is conveniently provided with a latch and a carrying handle, not shown. The carrying case 20 is specifically arranged to contain a hand mill 22, a measuring spoon 24 or other similar implement, a rectangular tray 26 for receiving comminuted material from the mill 22, a vessel 28 which defines a mixing chamber, a bottle 30 which encloses a quantity of capsules 32 that are filled with an indicator substance, and a pair of rubber gloves 34 which are rolled up for storage and which are used in collecting a dry sample. In addition, a color chart 36 and a time conversion chart 38 are included in the carrying case 20, being advantageously attached to the inside of the cover for ready reference. If desired, a stopwatch 40 may also be included with the contents of the carrying case 20 for use in the timing operation.

In order to enhance the understanding of the invention, use of the testing equipment and supplies included in the carrying case 20 will now be described with reference to the moisture testing of grain such as wheat. Upon being brought to the field of ripening wheat, the carrying case 20 will be opened and the gloves 34 extracted and put on. Thereafter, various heads of grain will be selected from different parts of the field; and the kernals of grain stripped from them, the grain being rubbed vigorously between the rubber-gloved hands in order to remove the chaff. As is indicated in FIG. 2, the palm sides of the gloves 34 are provided with a rough texture or abrasive substance 42 to facilitate the collection of the kernals of grain 43 and removal of the chaff. Although it is possible to measure the predetermined amount of grain before it is introduced into the mill 22 for grinding, particularly when a small grain such as wheat is involved, somewhat improved accuracy is achieved by grinding the grain first and then selecting the measured, predetermined amount. With reference to FIG. 3, therefore, the mill 22 is provided with an inlet 44 for receiving random amounts of the grain 43 which has been collected from the field. The mill 22 also includes an outlet 46 for discharging a random amount of the ground grain 48 to the tray 26, a grinding unit 50 being interposed between the inlet 44 and the outlet 46. A hand crank 52 is provided for operating the grinding unit 50.

The measured amount of ground grain is indicated in FIG. 4 by the numeral 54 as having been disposed in the mixing chamber defined by vessel 28. That figure additionally illustrates the opening of a capsule 32 for dropping a selected quantity of indicator material 56 which is contained therein into the mixing chamber of vessel 28 for intimate contact with the indicator. During the measuring and mixing process, care is exercised that neither the measured amount of ground grain nor the particles of indicator substance are touched by the bare hands. Actual mixing of the indicator substance and the measured amount of ground grain is readily achieved by revolving, shaking or otherwise mildly agitating the vessel 28.

Immediately upon introduction of the indicator substance 56 into the ground grain 54, timing is initiated as by starting the stopwatch 40. The color of the indicator substance is monitored against the colored panels of chart 36 until such time as the change which indicates that the desired reaction has been completed has occurred. At this time, timing is ceased and a reading taken. When anhydrous cobalt chloride is employed as the indicator substance, the initial color of the crystalline material is a deep blue while the endpoint color is a pale pink or a tawny hue. The time reading which has thus been made is then checked against the conversion chart 38, shown in detail in FIG. 5. The chart 38 shows that lower levels of moisture in the product to be tested are associated with longer times for the indicator substance to achieve its color change. The percentages specifically illustrated in FIG. 5 relate, of course, to specific amounts respectively of grain sample and indicator material as well as the specific indicator substance; and as has been pointed out hereinabove, different percentages and different time periods are involved for other products and for other indicator substances.

In order to enhance the understanding of the invention, a modified form of apparatus for use in quantitatively determining the presence of an extractible substance in a particulate solid material is shown in FIGS. 6–11. This apparatus is indicated generally by the numeral 60; and it comprises a processing unit 62, a container unit 64, a retention unit 66, a block that defines a transfer unit 68, and a housing unit 70. The housing unit 70 connects the container unit 64 and the retention unit 66 in positionally fixed relationship and includes a guideway 72 for directing movements of the transfer unit 68. One or more clips 74 detachably mount the processing unit 62 to the housing unit 70 in order that the processing unit may be removed if desired. The processing unit 62 is unnecessary when the solid material to be tested is naturally of a suitable size for the determination, such as for example when sand is to be examined. The processing unit 62 includes a medially disposed grinding device 76 which is operated by means of a crank handle 78, shown in FIG. 6, the processing unit 62 being fashioned with an inlet 80 that is adapted to receive random amounts of the solid material to be tested. The processing unit 62 additionally includes as is shown in FIG. 8, an outlet 82 for discharging finely divided particles of that material.

When the processing unit 62 is assembled with the housing unit 70, the container unit 64 is aligned beneath the outlet 82 for receiving a random quantity of the particles of the comminuted solid material to be tested as they pass from the grinding device 76. With reference to FIG. 8, the container unit 64 includes an exit opening 84 and contiguous walls 86 which converge toward the opening 84 to deliver the particles of comminuted solid material thereto. In addition, the guideway 72 is defined by two parallel, transverse plates, upper plate 88 and lower plate 90. Either upper plate 88 or lower plate 90 may be provided with side rails for use in controlling the transfer unit laterally. The transfer unit 68 slidably reciprocates in the guideway 72 and includes a bore 92 which is fashioned to take a predetermined volume whereby to define a measuring bin or element. The upper plate 88 is provided with a hole 94 that is aligned with the exit opening 84; and the measuring bin which is defined by bore 92 is alignable, in turn, with both the hole 94 and the exit opening 84 for accepting a filling quantity of the particles of solid material from the container unit 64. For this purpose, the bore 92 is fashioned with an open top end.

Continuing with reference to FIG. 8, the retention unit 66 is seen to include a retainer 96 of the springclip or friction type, the retainer 96 being attached to the housing unit 70 for releasably receiving a cartridge 98 of colorless, shearable material. The cartridge 98 is advantageously fabricated from a clear, resinous plastic material which may be sheared, such as for example, polystyrene, or it may be fabricated from gelatin. The cartridge 98 is intended to contain a selected quantity of an indicator substance 100 and is arranged to be of such a size and volume as to present a substantial headspace 102 above the indicator substance 100. This headspace is sufficiently large to receive the quantity of particulate solid material that has been measured by the bin 92 and to permit agitation of this material and the indicator substance for mixing the same. Ordinarily, the headspace 102 will occupy approximately two-thirds of the internal volume of the cartridge 98.

The retention unit 66 is so located as to position the cartridge laterally of the exit opening 84 spaced axially therefrom. Cooperatively, the lower plate 90 is perforated with a hole 104 which passes the upper end of the cartridge and which serves to cooperate with the retainer 96 in holding the cartridge in position. In order to accommodate the upper end of a cartridge 98 which is passed through the hole 94, the transfer unit 68 is fashioned with a recess 106; and a cutter blade 108 or other suitable incising element is attached to the transfer unit 68 adjacent an inner edge of the recess 106, that is, in advance of the bin 92. The cutter blade 108 is specifically disposed to operate in a path that intercepts the position of the upper portion of the cartridge 98 for shearing the top end off such cartridge; and to facilitate this shearing operation, the blade 108 is disposed at an angle as is shown in FIGS. 10 and 11. Reconsidering FIG. 6, the housing unit 70 is provided with a rectangular aperture 110 that permits egress of the transfer unit 68 when the same is reciprocated by a finger knob 112, knob 112 protruding through a horizontal slot 114 fashioned in the side of housing unit 70.

In accordance with the invention, the housing unit 70 incorporates a cage member 116 surrounding the cartridge 98, the cage member 116 being provided with optically open regions 118 for exposing the cartridge to visual examination. The optically open regions 118 may comprise areas of a translucent resinous plastic material or they may be made by perforating the housing unit 70 with physically open areas. This exposure permits visual determination of the precise moment when the indicator substance 100 has completed its color change. As is shown in FIGS. 8 and 9, the cage 116 is also provided with an open bottom 120 which admits light and which facilitates the placement and removal of the cartridge 98 from the retention unit 66.

Having thus described the embodiment of FIGS. 6–11, it is important now to state how that embodiment operates. Assuming that the solid material to be tested requires size reduction, the processing unit 62 will be mounted to the housing unit 70, clips 74 serving to hold these two members together. The finger knob 112 will then be operated to retract the transfer unit 68 so that the measuring bin 92 is aligned beneath the exit opening 84. Thereupon, a random amount of the solid material to be tested will be introduced into the inlet 80 of the processing unit 62. The handle 78 will then be grasped to rotate the grinding device 76 for comminuting the solid material. The finely divided particles 122 of the material to be tested pass from the grinding device 76 into the container means 64 as is shown in FIG. 8. Because of the converging nature of the walls 86, this finely divided material will be led into the exit opening 84 and from thence into the measuring bin 92 until the latter element has been filled.

Next, the finger knob 112 will be manipulated to extend the transfer unit 68 from the retracted position shown in FIG. 8 to the protruding position shown in FIG. 9. In the course of this transit, the cutter blade 108 will shear the cartridge 98, removing top end 124 thereof. After the cutter blade 108 has passed over the cartridge 98, final movement of the transfer unit 68 will align the measuring bin 92 over the now open cartridge 98 whereby to deposit the prescribed amount of finely divided material 122 into the cartridge with the indicator substance 100.

Keeping the transfer unit 68 in its protruding position, the apparatus 60 will be subjected to mild agitation to mix the comminuted material 122 and the indicator substance 100; and simultaneously, timing will be initiated. It will be recognized that observation of the indicator substance 100 is permitted by the colorless nature of the cartridge 98, by the open regions 118 and by the open bottom 120 of the housing unit 70. It will also be recognized that, by keeping the transfer unit in its protruding condition, the indicator substance 100 and the finely divided material 122 are mixed and held in a substantially closed environment during the timing stage. Accordingly, the mixture is protected from atmospheric moisture and from moisture on the skin of the hands of the person making the test as well as from the moisture in that person's breath. Sources of possible inaccuracies in the ultimate determination are thus avoided.

When the color change or end point has been reached, the timing will be stopped and the expired time compared against an appropriate chart, such as chart 38, in FIG. 5, whereby to convert the time reading into a weight percentage content of the extractible material being examined, as for example moisture. After the determination has been completed, the finger knob 112 will be manipulated to retract the transfer unit 68, whereupon the spent cartridge will be removed from the retention unit 66 by reaching through the open bottom 120 with the fingers; and a fresh cartridge will be placed in position in compliance with the showing of FIG. 8. The apparatus 60 is then readied for a new test.

The specific examples herein shown and described are to be considered as being primarily illustrative. Various changes and those described will, no doubt, occur to those skilled in the art; and such changes are to be understood as forming a part of this invention insofar as they fall within the spirit and scope of the appended claims.

The invention is hereby claimed as follows:

1. A method of quantitatively determining the presence of an extractible substance in a solid material, which method comprises the steps of: providing the solid material in particulate form whereby to expose said substance to ready extraction; measuring a predetermined amount of said particulate material; mixing with said amount a selected quantity of an indicator substance which has an affinity for said extractible substance, which undergoes a color change upon taking up said extractible substance, and which takes up various amounts of said extractible substance in determinable periods of time; determining the time required for said indicator substance to reach a particular color; and translating the time period thus determined to a quantitative measure of the presence of said extractible substance in said solid material.

2. A method of quantitatively determining the presence of an extractible substance in a solid material, which method comprises the steps of: comminuting the solid material for providing the same in finely divided form whereby to expose said substance to ready extraction; measuring a predetermined amount of said finely divided material; mixing with said amount a selected quantitiy of an indicator substance which has an affinity for said extractible substance, which undergoes a color change upon taking up said extractible substance, and which takes up various amounts of said extractible substance in determinable periods of time; determining the time required for said indicator substance to reach a particular color; and translating the time period thus determined to a quantitative measure of the presence of said extractible substance in said solid material.

3. A method of quantitatively determining the presence of an extractible substance in a solid material, which method comprises the steps of: providing the solid material in particulate form whereby to expose said substance to ready extraction; measuring a predetermined amount of said particulate material; mixing with said amount in a substantially closed environment a selected quantity of an indicator substance which has an affinity for said extractible substance, which undergoes a color change upon taking up said extractible substance, and which takes up various amounts of said extractible substance in determinable periods of time; holding said mixture in continuation of said substantially closed environment; determining the time required for said indicator substance to reach a particular color; and translating the time period thus determined to a quantitative measure in the presence of said extractible substance in said solid material.

4. A method of quantitatively determining the presence of moisture in a solid material which method comprises the steps of: providing the solid material in particulate form whereby to expose said moisture to ready extraction; measuring a predetermined amount of said particulate material; mixing with said amount a selected quantity of an anhydrous indicator substance which has an affinity for moisture, which undergoes a color change upon taking up moisture, and which takes up various amounts of moisture in determinable periods of time; determining the time required for said indicator substance to reach a particular color; and translating the time period thus determined to a quantitative measure of the presence of moisture in said solid material.

5. A method of quantitatively determining the presence of moisture in a solid material, which method comprises the steps of: providing the solid material in particulate form whereby to expose said moisture to ready extraction; measuring a predetermined amount of said particulate material; mixing with said amount in a substantially closed environment a selected quantity of an anhydrous indicator substance which has an affinity for moisture, which undergoes a color change upon taking up moisture, and which takes various amounts of moisture in determinable periods of time; holding said mixture in continuation of said substantially closed environment; determining the time required for said indicator substance to reach a particular color; and translating the time period thus determined to a quantitative measure of the presence of said moisture in said solid material.

6. A method of quantitatively determining the presence of moisture in a solid material, which method comprises the steps of: providing the solid material in particulate form whereby to expose said moisture to ready extraction; measuring a predetermined amount of said particulate material; mixing with said amount a selected quantity of anhydrous cobalt chloride; determining the time required for said cobalt chloride to pick up a given amount of moisture and reach a particular color; and translating the time thus determined to a quantitative measure of the presence of moisture in said material.

7. A method of quantitatively determining the presence of moisture in a solid material, which method comprises the steps of: comminuting the solid material for providing the same in finely divided form whereby to expose said moisture to ready extraction; measuring a predetermined amount of said finely divided material; mixing with said amount a selected quantity of anhydrous, finely divided cobalt chloride; determining the time required for said cobalt chloride to pick up a given amount of moisture and reach a particular color; and translating the time period thus determined to a quantitative measure of the presence of moisture in said solid material.

8. Apparatus for use in quantitatively determining the presence of an extractible substance in a particulate solid material, said apparatus comprising: container means for receiving a random quantity of the particles of said material, including an exit opening; retention means positionally fixed with respect to said container means and including a retainer for holding a hollow cartridge of shearable material in position laterally of said exit opening and spaced axially therefrom; and transfer means operably disposed to reciprocate in the space between said retainer and said exit opening transversely thereof, including an incising element disposed to operate in a path intercepting the position of the upper portion of said cartridge held in said retainer for shearing the top end off said cartridge, said transfer means further including a measuring bin of predetermined volume having an open top alignable with said exit opening for accepting a filling quantity of the particles of said material from said container means whereby to extract a prescribed amount thereof, said measuring bin further having an open bottom disposed in trailing relationship with respect to said incising element whereby to deposit said prescribed amount of the solid material in said cartridge after said incising element has sheared the same.

9. Apparatus for use in quantitatively determining the presence of an extractible substance in a particulate solid material, said apparatus comprising: container means for receiving a random quantity of the particles of said material, including an exit opening; retention means positionally fixed with respect to said container means and including a retainer for holding a hollow cartridge of shearable material in position laterally of said exit opening and spaced axially therefrom; transfer means operably disposed to reciprocate in the space between said retainer and said exit opening transversely thereof, including an incising element disposed to operate in a path intercepting the position of the upper portion of said cartridge held in said retainer for shearing the top end off said cartridge, said transfer means further including a measuring bin of predetermined volume having an open top alignable with said exit opening for accepting a filling quantity of the particles of said material from said container means whereby to extract a prescribed amount thereof, said measuring bin further having an open bottom disposed in trailing relationship with respect to said incising element whereby to deposit said prescribed amount of the solid material in said cartridge after said incising element has sheared the same; and housing means connecting said container means and said retention means and including a guideway for directing the movements of said transfer means.

10. Apparatus for use in quantitatively determining the presence of an extractible substance in a particulate solid material, said apparatus comprising: container means for receiving a random quantity of the particles of said material, including an exit opening; retention means positionally fixed with respect to said container means and including a retainer for holding a hollow cartridge of shearable material in position laterally of said exit opening and spaced axially therefrom; transfer means operably disposed to reciprocate in the space between said retainer and said exit opening transversely thereof, including an incising element disposed to operate in a path intercepting the position of the upper portion of said cartridge held in said retainer for shearing the top end off said cartridge, said transfer means further including a measuring bin of predetermined volume having an open top alignable with said exit opening for accepting a filling quantity of the particles of said material from said container means whereby to extract a prescribed amount thereof, said measuring bin further having an open bottom disposed in trailing relationship with respect to said incising element whereby to deposit said prescribed amount of the solid material in said cartridge after said incising element has sheared the same; and housing means connecting said container means and said retention means and including a guideway for directing the movements of said transfer means, said housing means having optically open regions adjacent said retainer for exposing the cartridge to visual examination.

11. Apparatus for use in quantitatively determining the presence of an extractible substance in a particulate solid material, said apparatus comprising: processing means having an inlet for receiving random amounts of said solid material, an outlet for discharging finely divided particles of said material, and grinding means disposed between said inlet and said outlet; container means aligned beneath said outlet for receiving a random quantity of the particles of said material, including an exit opening and walls converging towards said opening; retention means positionally fixed with respect to said container means and including a retainer for holding a hollow cartridge of shearable material in position laterally of said exit opening and spaced axially therefrom; and transfer means operably disposed to reciprocate in the space between said retainer and said exit opening transversely thereof, including an incising element disposed to operate in a path intercepting the position of the upper portion of said cartridge held in said retainer for shearing the top end off said cartridge, said transfer means further including a measuring bin of predetermined volume having an open top alignable with said exit opening for accepting a filling quantity of particles of said material from said container means whereby to extract a prescribed amount thereof, said measuring bin further having an open bottom disposed in trailing relationship with respect to said incising element whereby to deposit said prescribed amount of the solid material in said cartridge after said incising element has sheared the same.

12. Apparatus for use in quantitatively determining the presence of an extractible substance in a particulate solid material, said apparatus comprising: processing means having an inlet for receiving random amounts of said solid material, and an outlet for discharging finely divided particles of said material, and grinding means disposed between said inlet and said outlet; container means aligned with said outlet for receiving a random quantity of the particles of said material, including an exit opening; retention means positionally fixed with respect to container means and including a retainer for holding a hollow cartridge of shearable material in position laterally of said exit opening and spaced axially therefrom; transfer means operably disposed to reciprocate in the space between said retainer and said exit opening transversely thereof, including an incising element disposed to operate in a path intercepting the position of the upper portion of said cartridge held in said retainer for shearing the top end off said cartridge, said transfer means further including a measuring bin of predetermined volume having an open top alignable with said exit opening for accepting a filling quantity of the particles of said material from said container means whereby to extract a prescribed amount thereof, said measuring bin further having an open bottom disposed in trailing relationship with respect to said incising element whereby to deposit said prescribed amount of the solid material in said cartridge after said incising element has sheared the same; housing means connecting said container means and said retention means and including a guideway for directing the movements of said transfer means; and means detachably mounting said processing means to said housing means.

References Cited by the Examiner

UNITED STATES PATENTS

| 934,590 | 9/1909 | Brandrick | 241—301 |
|---|---|---|---|
| 2,526,938 | 10/1950 | Davis et al. | 252—408 |

RICHARD C. QUEISSER, *Primary Examiner.*

DAVID SCHONBERG, *Examiner.*